United States Patent Office 3,182,763
Patented May 11, 1965

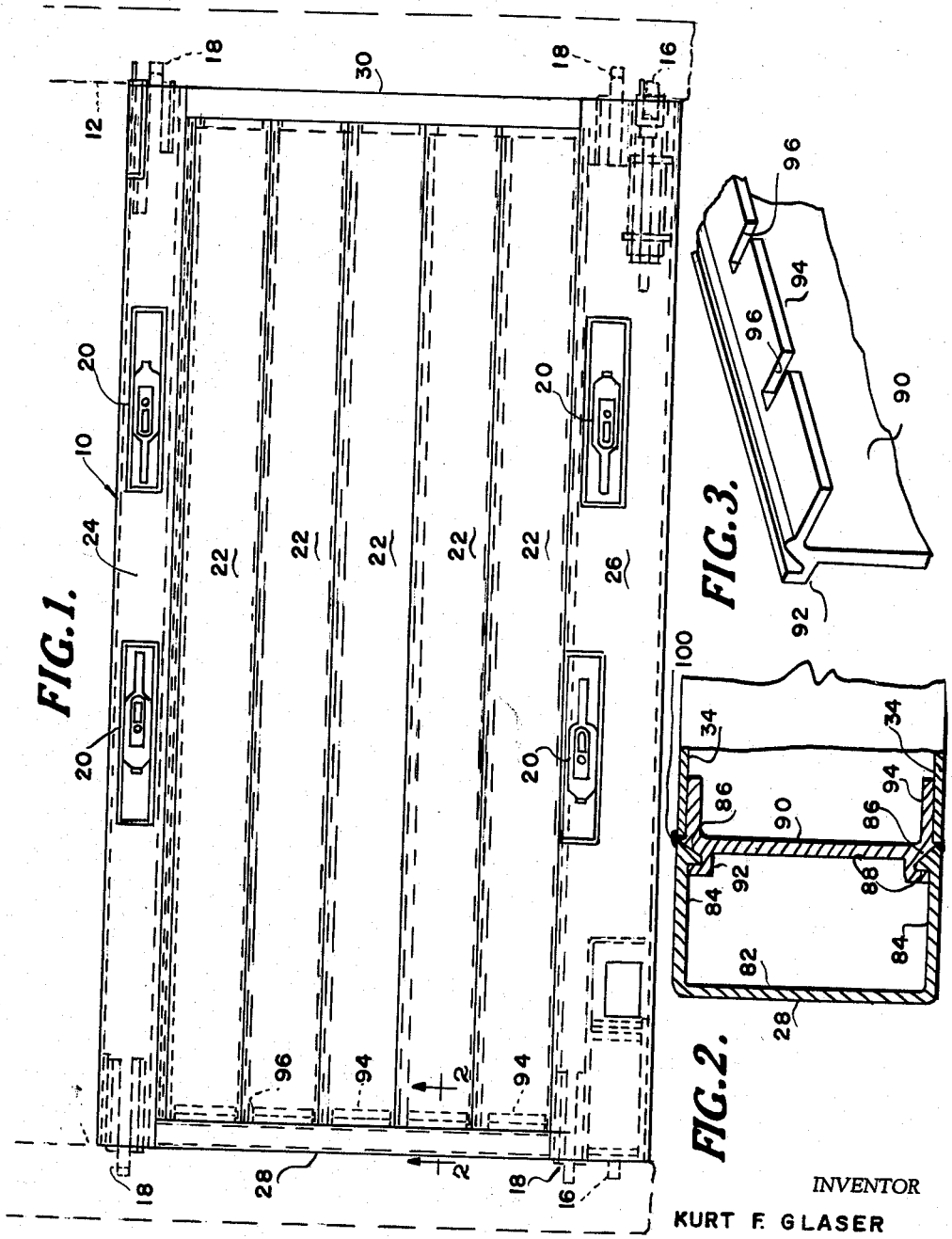

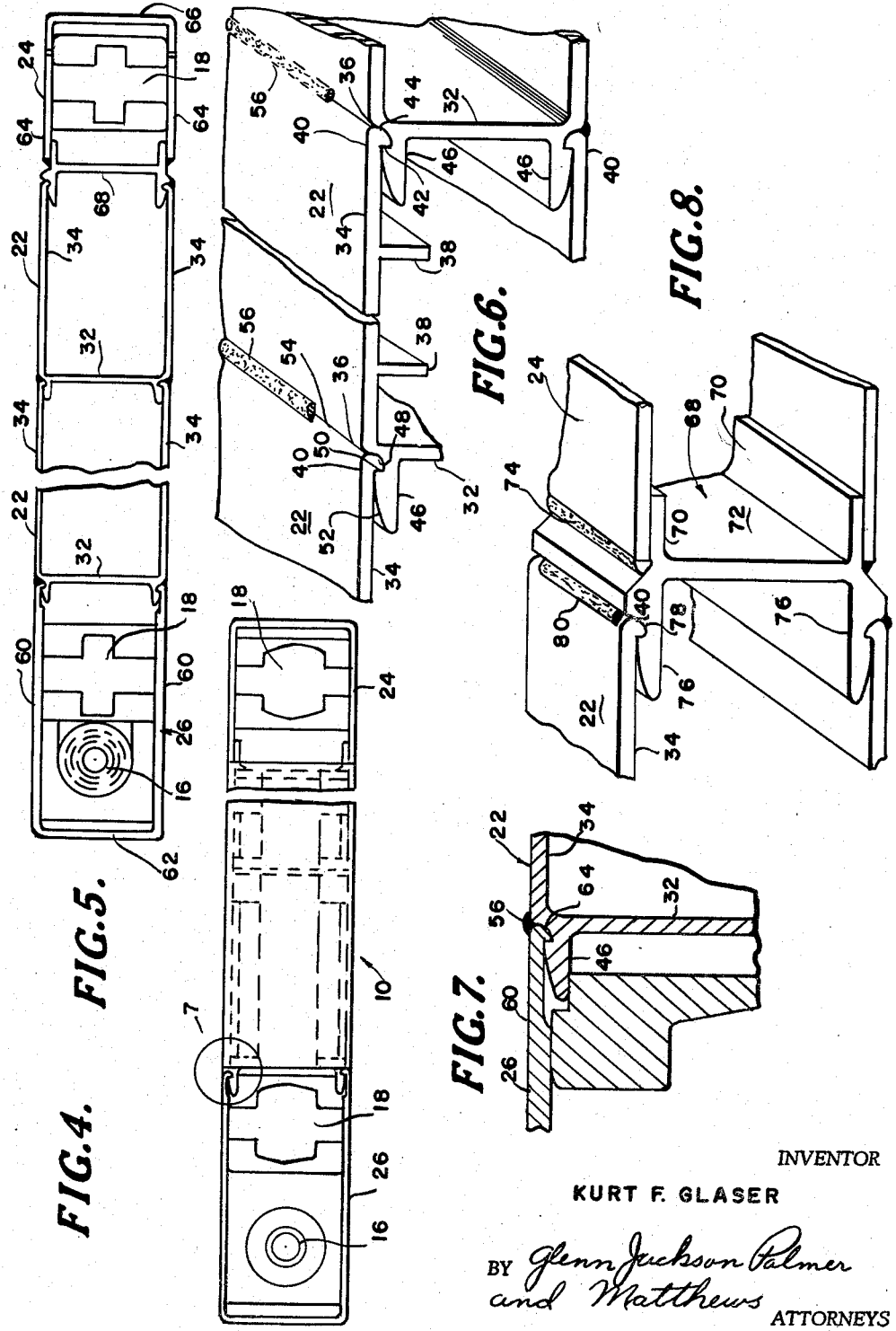

3,182,763
HIGH-STRESSED DOUBLE WALL PARTITIONS OR THE LIKE FOR FREIGHT CAR DIVIDERS
Kurt F. Glaser, Chesterfield County, Va., assignor to Reynolds Metals Company, Richmond, Va., a corporation of Delaware
Filed May 4, 1961, Ser. No. 107,780
5 Claims. (Cl. 189—34)

The present invention relates to partition dividers for freight cars or the like and, more particularly, to high-stressed double-wall partitions made from extrusions having complementary profile configurations so formed that they can be interlockingly engaged and assembled.

Freight cars, trucks or like vehicles have been heretofore compartmentized by providing pivotal and/or movable walls. Oftentimes the cargo being transported was heavy and, consequently, imposed heavy loads upon such partitions or dividers. Since freight loads for vehicles vary in weight it was necessary to construct partitions from heavy timbers or heavy steel and the like so that they could absorb the maximum anticipated loads imposed thereon by the cargo either from the dead weight of the cargo or possibly from a shifting load of the cargo. Because such walls as heretofore constructed were necessarily heavy in order that they could withstand the maximum loads which might be imposed upon them, it meant that the carrier was moving a great deal of dead weight when light or no loads were being transported. This dead weight was considered as a non-revenue-producing weight.

An important object of the present invention is to provide a partition wall or divider for use in vehicles or the like which is light weight in construction yet capable of high stresses or loads imposed upon it by cargo or the like.

Another object of the present invention is to provide a double wall structure assembled from a plurality of extruded sections, the extrusions being provided with improved complementary interlocking configurations whereby the assembly when fabricated results in a wall having extra strength in the area where the sections are locked together.

Ancillary to the preceding object, it is a further object of the present invention to provide a double wall structure made up of interlocking extruded sections, the sections being welded together after being assembled in interlocking relationship, the weld zones being provided in an area of greatest strength in order that the welds can assume maximum loads encountered.

A further object of the present invention is to provide an improved high stress double wall partition structure made from a plurality of extruded sections, some of the extruded sections defining the terminal longitudinal and transverse edges of the wall partition.

Another object of the present invention is to provide wall partitions for vehicles or the like utilizing extruded sections made from aluminum and having substantially the same strength characteristics as steel, the partition walls being lighter in weight so as to substantially reduce the non-paying load of the vehicle so equipped.

Still another object of the present invention is to provide a cargo divider for vehicles such as freight cars, trucks or the like, which may be quickly assembled from extruded sections having interlocking profile configurations and, after assembly, the sections being permanently joined together by automatic welding equipment having as many welding torches as extrusions so as to reduce the overall construction time.

These and other objects and advantages of the present invention will become more apparent from the following specification, claims and accompanying drawings in which:

FIGURE 1 illustrates a plan view of a wall partition made in accordance with the present invention, the view illustrating the wall partition supported between a floor and a roof of a vehicle;

FIGURE 2 is an enlarged sectional view taken on the line 2—2 of FIGURE 1 and illustrating the attachment of a transverse extruded edge section;

FIGURE 3 is an enlarged fragmentary perspective view of the extruded section for attaching the transverse edge section to the ends of the extruded sections forming the main portion of the panel;

FIGURE 4 is a top plan view of the panel illustrated in FIGURE 1 looking from the left to the right thereof;

FIGURE 5 is a bottom plan view of the partition illustrated in FIGURE 1 looking from the right to the left thereof;

FIGURE 6 is an enlarged fragmentary perspective view illustrating the extruded sections for forming the main body portion of the panel;

FIGURE 7 is an exploded view of the portion encircled in FIGURE 4 and idenified by the numeral 7; and FIGURE 8 is an enlarged fragmentary perspective view illustrating the attaching of one of the longitudinal edge sections to the extruded sections making up the main body portion of the partition.

Referring now to the drawings wherein like characters or reference numerals represent like or similar parts, and in particular to FIGURE 1, a partition wall structure generally designated by the numeral 10 is illustrated mounted in a vehicle such as a freight car or the like between the bottom floor 12 of the vehicle and the top or roof 14. It will be noted that the partition wall structure 10 is provided with the usual hardware shown in dotted lines for supporting the same in a desired position. In more detail, the hardware may include the pivot pins 16 about which the partition can be swung and the usual sliding locks 18 for fixedly holding the wall structure 10 in a desired position. The locks 18 may be operated by suitable handle mechanism 20 recessed in the side of the wall structure 10, the handle mechanism being for the purpose of extending and withdrawing the sliding locks from suitable holes provided in the floor 12 and roof 14.

The partition wall structure 10 includes a plurality of elongated extruded sections 22 which are U-shaped in cross-section and which have complementary interlocking edge configurations so that they may be quickly snapped into engagement with one another to form the main body portion of the double wall structure. The longitudinal edges of the two outermost extruded sections 22 are closed off by channel or U-shaped extruded sections 24 and 26, the sections 24 and 26 being attached to the respective sections 22, as described in more detail later in the specification. The transverse ends of the sections 22 are closed off by U-shaped channel sections 28 and 30 which are attached to the ends of the sections 22, as will be described in more detail later in the specification.

As illustrated in FIGURE 1, the assembled sections 22, 24, 26, 28 and 30 form a substantially rectangular rigid partition wall structure 10 having substantially flat outer surfaces and smooth terminal edges. Once the sections 22 have been arranged in interlocking relationship with each other and with the sections 24 and 26, suitable automatic welding equipment (not shown) utilizing a plurality of suitably spaced welding torches can simultaneously provide welds in the weld zones between adjoining sections 22 whereas weld zones provided between the section 28 and the ends of the sections 22 as well as between the section 30 and the opposite ends of the sections 22 may be subsequently completed.

Referring now to FIGURES 4, 5 and 6, each extruded section 22 is substantially identical and, as previously mentioned, is channel or U-shaped in cross-section so as to be provided with a web portion 32 having a pair of parallel legs 34 integral therewith and extending outwardly from one surface of the web portion 32 along each longitudinal edge of the web portion. The legs 34 of a section 22 form a portion of each side wall of the double wall structure 10. At the point of junction between the legs 34 and the web portion 32, the edge is gently rounded, as indicated at 36 (FIGURE 6), for the purpose explained later in the specification. The legs 34 may be provided on their inner surfaces with one or more stiffening ribs 38 extending along the entire length of the legs, the number of stiffening ribs 38 depending upon the width of the legs and upon the anticipated loads to be imposed upon the final partition wall structure 10.

Along the longitudinal free edge of each leg 34 of section 22, there is provided a locking ridge 40, the locking ridge 40 of one leg opposing the locking ridge 40 of the other leg of a particular section. Each locking ridge 40 is provided with an undercut portion 42 defining a flat locking surface facing the inner surface of the web portion 32. As best illustrated in FIGURE 6, the locking ridge 40 of each leg 34 is provided with a beveled surface 44 which is preferably convexly curved, the curvature 42 starting on the outer surface of the leg 34 and terminating at the edge of the undercut portion 42.

A pair of parallel locking ribs 46 extend outwardly from the outer surface of the web portion 32 in a direction generally parallel to but opposite that of the legs 34. The locking ribs 46 of one section 22 are oppositely disposed with respect to each other and are provided with a profile configuration complementary to the profile configuration of the locking ridges 40. In more detail, the locking ribs 46 are each spaced inwardly from the junction of the legs 34 with the web portion 32 and are provided with a groove 48 at the junction of the legs 34 with the web portion 32. The groove 48 is provided with a flat locking surface 50 which faces the web portion 32 and which is adapted to abut the flat surface 42 of locking ridge 40. As clearly shown in FIGURE 6, the groove 48 is complementary to a portion of the convexly curved surface 44 of the locking ridge 40 and flares into the curved portion 36 at the point of junction between the legs 34 and the web portion 32. Outwardly of the groove 48, the locking ribs 46 are provided with a gently convexly curved camming surface 52 which defines a rounded nose portion for the locking rib 46.

In assembling extruded sections 22 to each other, it will now be evident from the illustrations in FIGURES 5 and 6 that the curved surface 44 of the locking ridges 40 engage the curved camming surface 52 of the locking ribs 46 and flex the legs 34 outwardly with respect to each other until the locking ridges 40 pass over and snap into the grooves 48 with the flat surfaces 42 and 50 abutting one another to prevent displacement of the sections with respect to each other. When the sections 22 are in interlocking engagement with each other, the curved surface 36 at the point of junction between the legs 34 and the web portion 32 and the curved surface 44 of the locking ridges 40 define a slightly depressed weld zone extending along the length of two adjacent interlocked sections 22. It will be noted that this weld zone generally designated at 54 is in direct alignment with the web portion 32 of one of the sections 22 and, consequently, when a weld 56 is provided in the weld zone 54, the loads imposed upon the finished wall structure 10 are not assumed by and do not affect the weld, as the weld is at a point where maximum stresses can be received. Further, as mentioned heretofore, once the plurality of extruded sections 22 have been interlocked together with each other to form a major body portion of the high stress double wall structure 10, the weld zones 54 are parallel to each other and spaced apart an equal distance so that it is very easy to simultaneously apply a weld to each of the weld zones by use of automatic weld equipment having a plurality of suitably spaced welding torches.

Referring now to FIGURES 5 and 7, the extruded section 26 which provides a terminal longitudinal edge on one side of the wall structure 10 is U-shaped in cross-section having legs 60 extending from a surface of its web portion 62. The outer free edges of the legs 60 are provided with locking ridges 64 complementary to the grooves 48 of the locking ribs 46. In addition, it will be noted that the web portion 62 of the section 26 has an unobstructed outer surface. Of course, the hardware such as the pivot pins 16 and slide locks 18 are supported within the area enclosed by the section 26.

Since the outermost section 22 on the opposite side of the wall structure 10 is facing in such a manner that its legs 34 are extending outwardly toward the terminal edge, the opposite longitudinal terminal edge section 24 is attached to the section 22 in a slightly different manner than that of the section 26.

Referring now to FIGURES 5 and 8, it will be noted that the extruded section 24 is U-shaped in cross-section having legs 64 integral with and extending from a web portion 66. The legs 64 are not provided with locking ridges, as this section 24 must be operatively attached to a section 22 having its legs 34 extending toward the legs 64. In order to attach the section 24 to an adjoining section 22, an attachment extrusion 68 is provided. The attachment extrusion 68 in H-shaped in cross-section and is provided with a pair of flanges 70 extending from one surface of its web portion 72, the flanges 70 being spaced apart a distance equal to the distance between the opposed inner surfaces of the legs 64. As clearly shown in FIGURE 8, the section 24 is slid onto the flanges 70 of extrusion 68 and a weld 74 is provided along the longitudinal free edges of the legs 64 to rigidly and permanently attach the same to the section 68. The section 68 is also provided with a pair of parallel and spaced apart locking ribs 76 identical with the locking ribs 46 on the sections 22. The legs 34, with their locking ridges 40, snap into interlocking engagement with the complementary grooves 78 provided on the ribs 76. A weld 80 rigidly secures the legs 22 to the section 66, as shown in FIGURE 8.

Referring now to FIGURES 2 and 3, there is illustrated the attachment means for attaching the terminal transverse extruded edge section 28 to the transverse edges of the sections 22. Since the extruded section 30 is identical to the section 28 and its attachment means is also identical, the description with respect to the section 28 will suffice for both sections 28 and 30. In more detail, the extruded section 28 is U-shaped in cross-section and is provided with a web portion 82 having a pair of legs 84 integral therewith and extending from one surface thereof along the edges of the same. The legs 84 are provided along their free edges with locking ridges 86 having an undercut portion 88 defining a flat locking surface facing the web 82. The locking ridges 86 are oppositely disposed with respect to each other. An extuded attachment section 90 having substantially the same length as the section 28 is provided with a pair of hook-shaped locking ribs 92. The locking ribs 92 are oppositely disposed with respect to each other and are complementary in shape to the locking ridges 86 of the legs 84. Provided on the other side of the extrusion 90 is a pair of flanges 94 spaced apart a distance equal to the spacing between legs 34 of sections 22. The flanges 94 are provided with notches 96, as best shown in FIGURE 3, the notches 96 being positioned thereon wherever the web portion 32 of one of the sections 22 is located. In other words, the notches 96 are adapted to receive the web portions 32 so that the transverse edges of the legs 34 can be received over the flanges 94, as shown in FIGURE 2. When the section 90 is assembled on the legs 34 and the section 28 is snapped over and locked with the hook-shaped ribs 92, a weld 100 permanently attaches the section 28 to the section 90 as well as to the transverse ends of the sections 22.

It is thus seen that the objects and advantages of this invention have been fully and effectively accomplished by the double wall structure illustrated in the drawings and heretofore described. The wall structure, while light in weight, has the necessary strength to support loads imposed thereon by cargo or the like. However, the structure herein described is subject to some changes without departing from the principles of the invention involved.

The terminology used in the specification is for the purpose of description and not limitation, the scope of the invention being defined in the claims.

What is claimed is:

1. A substantially rectangular partition wall structure for use in vehicles or the like comprising a plurality of elongated extruded sections U-shaped in cross-section and adapted to be assembled into interlocking engagement with each other to form a rigid unit, each of said U-shaped extruded sections including a web portion and a pair of flange-like legs integral therewith and extending outwardly from one surface of the web portion along each longitudinal edge thereof and defining a portion of spaced parallel walls, a locking ridge extending along the free edge of each leg, the locking ridge of one leg opposing the locking ridge of the other leg, a pair of spaced locking ribs extending outwardly of the web portion in a direction opposite to said legs, said pair of locking ribs being arranged inwardly respectively of junctions of the legs with the web portion, the construction and arrangement of the U-shaped extruded sections into the partition wall structure being such that the legs of one U-shaped channel section can be spread apart by complementary locking ribs on another U-shaped section and then snapped into locking position to firmly lock the extruded U-shaped sections together as a unit, a pair of U-shaped extruded sections for providing terminal longitudinal edges of the partition wall structure, one of said last-mentioned pair of U-shaped extruded terminal edge sections including a web portion and a pair of flange-like legs integral therewith and extending outwardly of one surface of the web portion along each longitudinal edge thereof, each flange-like leg having locking ridges for cooperating with locking ribs of one of said first-mentioned U-shaped extruded sections, the other of said pair of U-shaped terminal edge extruded sections having a web and a pair of flange-like legs integral therewith and extending outwardly from one surface of the web portion along each longitudinal edge thereof, and an H-shaped extruded section provided with a pair of locking ribs for cooperating with locking ridges on the legs of one of said first-mentioned extruded sections, said H-shaped section including a pair of opposed flanges for receiving the free edges of the legs of the other of said terminal edge extruded section whereby the same may be welded thereto.

2. A substantially rectangular partition wall structure for use in vehicles or the like comprising a plurality of elongated extruded sections U-shaped in cross-section and adapted to be assembled into interlocking engagement with each other to form a rigid unit, each of said U-shaped extruded sections including a web portion and a pair of flange-like legs integral therewith and extending outwardly from one surface of the web portion along each longitudinal edge thereof and defining a portion of spaced parallel walls, a locking ridge extending along the free edge of each leg, the locking ridge of one leg opposing the locking ridge of the other leg, a pair of spaced locking ribs extending outwardly of the web portion in a direction opposite to said legs, said pair of locking ribs being arranged inwardly respectively of junctions of the legs with the web portion, the construction and arrangement of the U-shaped extruded sections into the partition wall structure being such that the legs of one U-shaped channel section can be spread apart by complementary locking ribs on another U-shaped section and then snapped into locking position to firmly lock the extruded U-shaped sections together as a unit, a pair of U-shaped extruded sections for providing terminal transverse edges of the partition wall structure, each of said U-shaped terminal transverse edge extruded sections including a web portion and a pair of flange-like legs integral therewith and extending outwardly of one surface of the web portion along each longitudinal edge thereof, each flange-like leg having a locking ridge along its free edge, the locking ridge of one leg of a pair opposite the locking ridge of the other leg of the pair, and a pair of extruded sections for respectively attaching the pair of terminal transverse edge extruded sections to the ends of said first-mentioned plurality of interlocked extruded sections, each of said last-mentioned attaching sections including a web portion, a pair of flanges extending outwardly of one surface of said web portion and spaced apart a distance equal to the distance between pairs of legs of said first-mentioned U-shaped extruded sections, each of said flanges being provided with spaced notches along the free edge thereof for receiving the web portions of said first-mentioned extruded sections, a pair of flange-like ribs on each of said last-mentioned sections extending outwardly of the other surface of the web portion thereof, said last-mentioned ribs being hook-shaped in cross-section and adapted to receive the locking ridges on the legs of the terminal transverse edge sections.

3. A double wall high stress partition structure for use in vehicles or the like comprising: a first wall portion, a second wall portion parallel to and spaced from said first wall portion, a plurality of webs arranged parallel and in spaced relationship to each other and extending between the inner surfaces of said first and second wall portions, said webs having a length substantially equal to the length of said wall portions, means for closing the transverse open ends defined by said first and second wall portions, said means including a pair of extruded sections each having a web portion and a pair of flanges extending outwardly of one surface of said web portion in spaced apart distance equal to the distance between said first and second wall portions, said flanges being provided with spaced notches along their free edge for receiving the ends of the webs between said first and second wall portions, a pair of flange-like ribs on each of said last-mentioned sections extending outwardly of the other surface of the web portion thereof, said ribs being hook-shaped in cross-section, and a pair of U-shaped extruded sections including a web portion and a pair of flange-like legs integral therewith and extending outwardly of one surface thereof along each longitudinal edge thereof, each flange-like leg having a locking ridge along its free edge, the construction and arrangement being such that the legs of one section can be spread apart by the locking ridges of the same when engaging the hook-shaped ribs and then snapped into locking engagement therewith to firmly lock the same together as a unit.

4. A double wall high stress partition structure for use in vehicles or the like comprising a first wall portion, a second wall portion parallel to and spaced from said first wall portion, a plurality of webs arranged parallel and in spaced relationship to each other and extending between the inner surfaces of said first and second wall portions, said webs having a length substantially equal to the length of said wall portions, and means for closing the transverse open ends defined by said first and second wall portions, said means for closing the transverse open ends including a pair of extruded sections each having a web portion and a pair of flanges extending outwardly from one surface of said web portion, each pair of flanges being provided with spaced notches along their free ends in which are received the ends of the webs between said first and second wall portions.

5. A double wall high stress partition structure for use in vehicles or the like comprising a first wall portion, a second wall portion parallel to and spaced from said first wall portion, a plurality of webs arranged parallel and in spaced relationship to each other and extending between the inner surfaces of said first and second wall portions, said webs having a length substantially equal to the length of said wall portions, means for closing the transverse open ends defined by said first and second wall portions, said means for closing the transverse open ends including a pair of extruded sections each having a web portion and a pair of flanges extending outwardly from one surface of said web portion, each pair of flanges being provided with spaced notches along their free ends in which are received the ends of the webs between said first and second wall portions, and means for closing the longitudinal ends defined by said first and second wall portions, said means for closing the longitudinal ends including a pair of extruded sections each having a web portion and a pair of flanges extending outwardly of one surface of said web portion a spaced apart distance equal to the distance between said first and second wall portions.

References Cited by the Examiner

UNITED STATES PATENTS

| | | | |
|---|---|---|---|
| 863,779 | 8/07 | Budd | 189—34 |
| 2,866,527 | 12/58 | Schilling. | |
| 2,878,904 | 3/59 | Fanner | 189—34 |
| 2,926,928 | 3/60 | Bennett | 189—34 X |
| 3,007,558 | 11/61 | Miller | 189—34 |
| 3,024,880 | 3/62 | Burmeister | 189—34 X |

FOREIGN PATENTS

| | | |
|---|---|---|
| 795,737 | 5/58 | Great Britain. |
| 1,245,055 | 9/60 | France. |

JACOB L. NACKENOFF, *Primary Examiner.*

JOEL REZNEK, RICHARD W. COOKE, *Examiners.*